(No Model.) 2 Sheets—Sheet 1.
J. W. LATIMER & J. A. GRAHAM.
POLE CONNECTION FOR HARVESTERS.
No. 576,406. Patented Feb. 2, 1897.
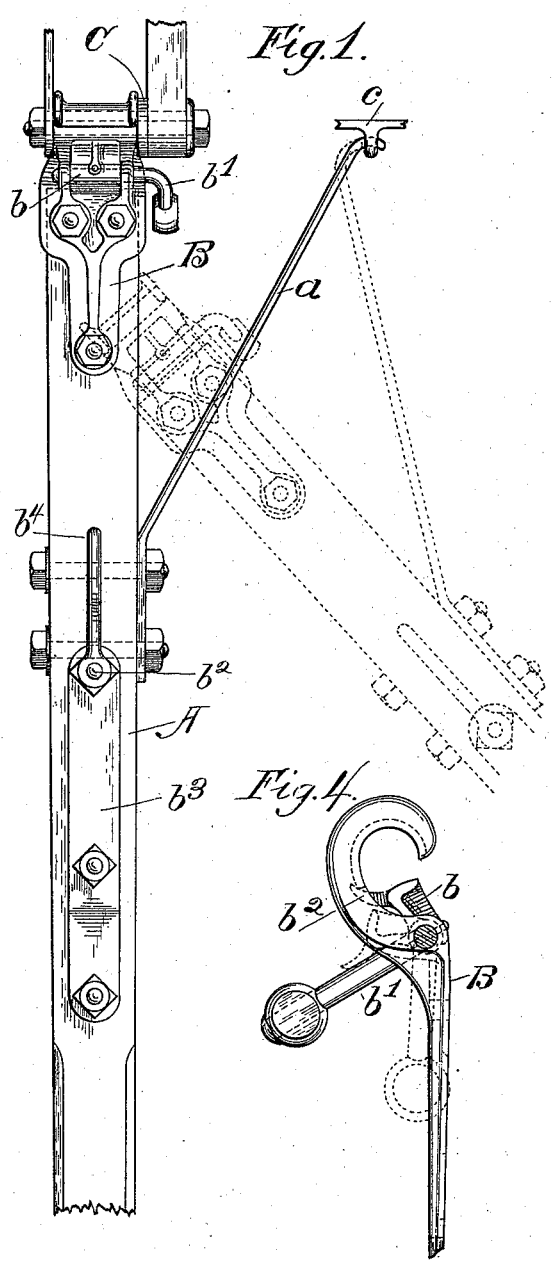
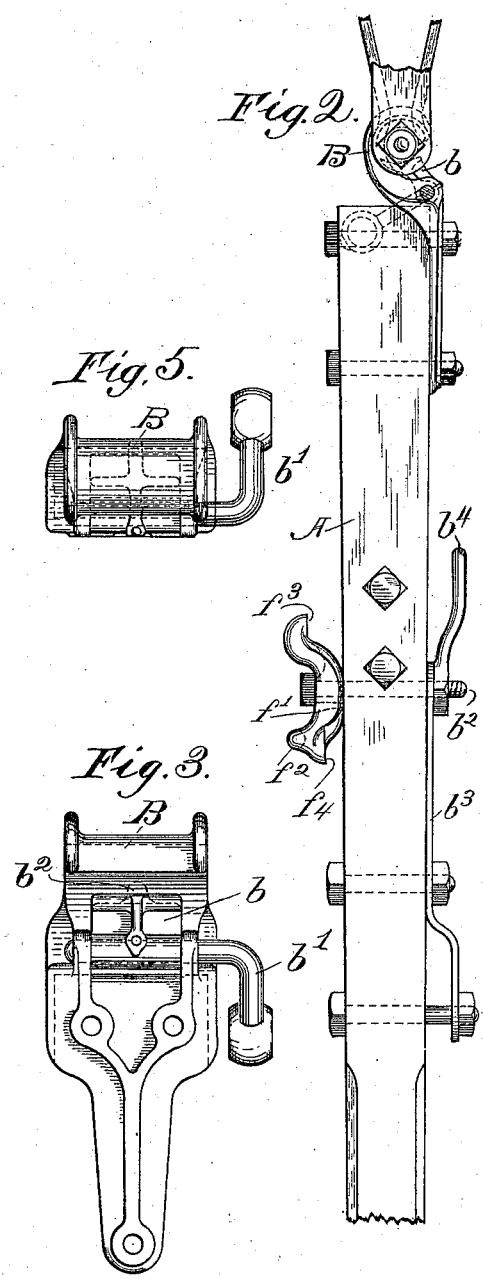

(No Model.)  2 Sheets—Sheet 2.
J. W. LATIMER & J. A. GRAHAM.
POLE CONNECTION FOR HARVESTERS.
No. 576,406. Patented Feb. 2, 1897.
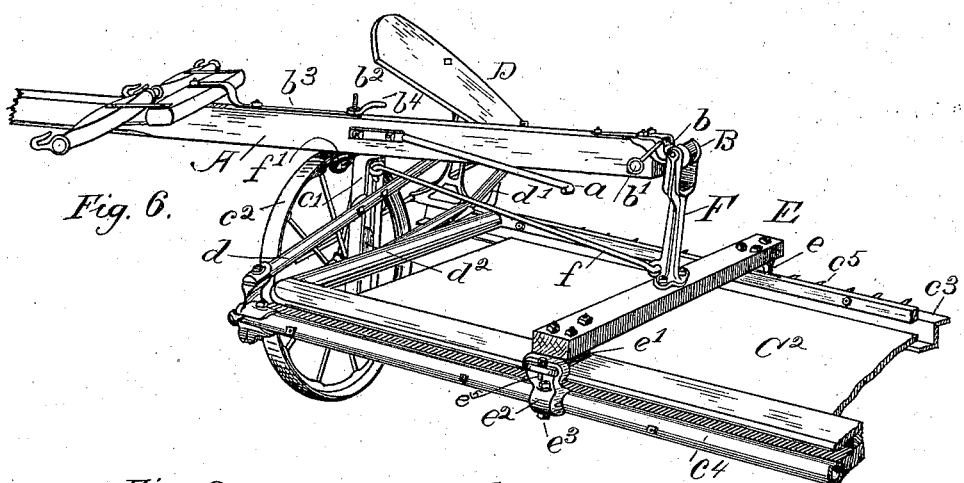
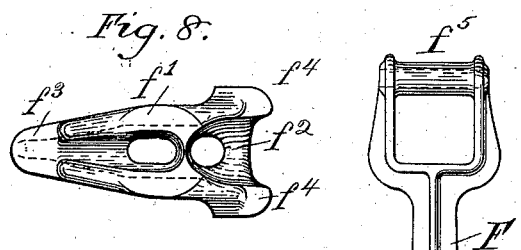
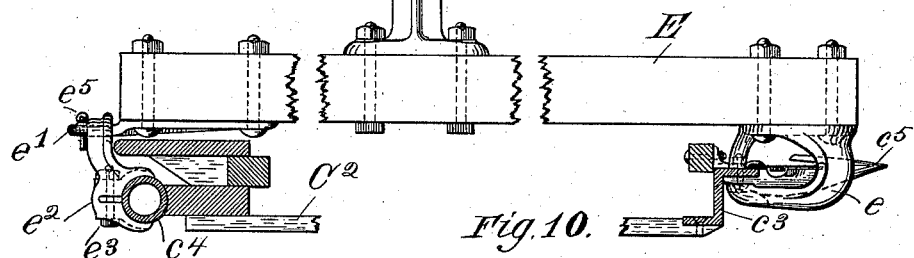
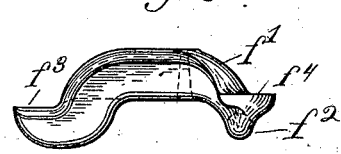
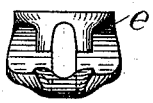
Witnesses:
Chas. L. Goss.
Frank H. Krehl
Inventors:
John W. Latimer
James A. Graham
By Winter, Sandlus, Smith, Bottum & Hiles
Attorneys.
THE NORRIS PETERS CO., PHOTO-LITHO., WASHINGTON, D. C.

UNITED STATES PATENT OFFICE.

JOHN W. LATIMER AND JAMES A. GRAHAM, OF MILWAUKEE, WISCONSIN, ASSIGNORS TO THE MILWAUKEE HARVESTER COMPANY, OF WISCONSIN.

POLE CONNECTION FOR HARVESTERS.

SPECIFICATION forming part of Letters Patent No. 576,406, dated February 2, 1897.

Application filed June 24, 1895. Serial No. 553,800. (No model.)

*To all whom it may concern:*

Be it known that we, JOHN W. LATIMER and JAMES A. GRAHAM, of Milwaukee, in the county of Milwaukee and State of Wisconsin, have invented certain new and useful Improvements in Pole Connections for Harvesters; and we do hereby declare that the following is a full, clear, and exact description of the invention, which will enable others skilled in the art to which it pertains to make and use the same, reference being had to the accompanying drawings, and to the letters of reference marked thereon, which form a part of this specification.

Our invention relates to an improved means of attaching and detaching a harvester-pole to and from the machine and of connecting it with the end of the machine with or without unhitching the team.

To move a harvester and binder along narrow roadways and through narrow passages, it is necessary to load the machine upon a transport. To the end that much of the labor and time ordinarily required to effect the changes necessary for this purpose may be saved, our invention consists, essentially, in a self-locking clasp for connecting the pole with the harvester, novel means of attaching the pole to the end of the harvester-platform by which the machine is drawn when upon the transport, and also in certain other novel features in the construction and arrangement of parts, as hereinafter particularly described, and pointed out in the claims.

In the accompanying drawings, showing only such parts of a harvester as are essential to a clear understanding of our improvements, like letters designate the same parts in the several figures.

Figure 1 is a plan view of a harvester-pole and its attachments and immediate connections embodying our improvements. Fig. 2 is a side view of the same. Fig. 3 is a plan view of the pole-fastening on an enlarged scale. Fig. 4 is a side elevation of the fastening. Fig. 5 is an inverted rear end view of the same. Fig. 6 is a perspective view of a harvester-platform, showing the method of attaching the pole thereto for transportation. Fig. 7 is an enlarged side view of the pole-support on the platform and its attachments. Figs. 8 and 9 are respectively enlarged plan and side views of the attachment for securing the pole to the grain-wheel and platform, and Fig. 10 is an enlarged front end view of the attachment for securing the pole-support to the finger-bar.

A is the harvester-pole, provided at its rear end with a sleeve-shaped hook B, open on one side and adapted to be engaged with and to turn upon a horizontal pin or stud C, secured to the machine parallel with the finger-bar. The hook B has a tongue or latch $b$ pivoted therein and provided with a weighted arm $b'$, which tends to turn it upwardly into and hold it in the opening in said hook in position to retain the hook upon said pin or stud. The latch is prevented from swinging beyond its proper locking position in the opening of hook B by a stop or projection $b^2$, adapted to engage a shoulder or abutment on the hook, as shown in Fig. 4. The pole A is also provided with a laterally-projecting brace $a$, bolted at one end thereto and formed at the other end with a hook which is adapted to engage and turn in a staple or eye $c$, attached to the machine approximately in line with said stud C. The hook B being of a width about equal to the width of the pole and fitting upon the cylindrical stud C in connection with the brace $a$ holds the pole firmly in its proper relation to the machine, that is, at right angles to the finger-bar and platform, preventing it from turning on its longitudinal axis, but allowing it to swing vertically on a horizontal line passing through the stud C and eye $c$.

$C^2$ is the harvester-platform; $c'$, the grain-wheel guide, bolted to the upper and lower pipes or members $d$ and $d'$ of the divider-point D, which connects the finger-bar $c^3$ and rear sill $c^4$ of the platform. The grain-wheel $c^2$ is carried by a spindle which is adjustable vertically in the guide $c'$.

$c^5$ designates guard-fingers attached to the bar $c^3$ in the usual manner.

E is a cross-bar carrying the standard F for the attachment of the pole, as shown in Fig. 6. It is provided at the front end with a recessed block $e$, so constructed as to pass over one of the fingers $c^5$ and embrace the bar $c^3$, as shown in Fig. 7, and at its rear end with a projecting piece $e'$, adapted to pass through an ear $e^2$, which is clamped upon the sill $c^4$ by means of bolt $e^3$. A pin $e^5$, passing through the projection $e'$, holds it in ear $e^2$.

$f$ is a draw-rod connected at one end with the lower end of standard F and hooked at the other end for engagement with a loop $f^2$ on the block $f'$, which serves to fasten the pole to the grain-wheel guide $c'$ and grain-wheel $c^2$. The block $f'$ has at its front end a projection $f^3$ for engagement with the rim of the grain-wheel $c^2$ and at its rear end two projections $f^4$ for engagement with the upper end of the grain-wheel guide $c'$, and is secured to the under side of the pole by a bolt $b^2$, passing up through the pole and doubletree-strap $b^3$ and provided with a tail-nut $b^4$.

To make the changes required for transporting the harvester, the cross-bar E, carrying standard F, is placed across the platform, and the block $e$ passed over one of the guard-fingers into engagement with the finger-bar $c^3$ the required distance from the grain-wheel end of the platform. The projection $e'$ on the opposite end of the cross-bar is passed through ear $c^2$, which has been previously secured to the sill $c^4$, and the pin $e^5$ inserted in its place, as shown in Figs. 6 and 7. The weighted arm $b'$ is raised, causing the latch $b$ to assume the position shown by dotted lines in Fig. 4. The hook B is disengaged from stud C, the pole swung to the side, as shown by dotted lines in Fig. 1, and the brace $a$ disconnected from eye $c$. The pole is then placed upon grain-wheel guide $c'$, as shown in Fig. 6, the hook B engaged with a cross pin or piece $f^5$ at the upper end of support F and automatically locked thereon by latch $b$, the block $f'$ adjusted to engage the rim of the grain-wheel $c^2$ and the grain-wheel guide $c'$, the draw-rod $f$ hooked into loop $f^2$, and the tail-nut $b^4$ turned up, securing said block $f'$ in place to the under side of the pole.

To readjust the machine for use in the field, the above-described operations are simply reversed.

We claim—

1. In a pole connection for harvesting-machines, a part on the machine for the attachment of the pole, a hook upon the pole provided with a pivoted latch for connecting and disconnecting it with the machine, a cross-bar having fastenings for attachment to the finger-bar and rear sill of the platform and provided with a standard for the attachment of the pole, and an adjustable block adapted to secure the pole to the grain-wheel end of the machine, and a draw-rod for connecting the cross-bar with the adjustable block, substantially as and for the purposes set forth.

2. In a pole connection for harvesting-machines, a cross-bar having a connection for attachment of the pole and provided at one end with a block adapted to pass over one of the guard-fingers and embrace the finger-bar, and at the opposite end with a fastening for attachment to the rear-platform sill, an automatic fastening for connecting the pole with said cross-bar, and means for securing said pole to the grain-wheel end of the platform, substantially as shown and described.

In testimony that we claim the foregoing as our own we affix our signatures in presence of witnesses.

JOHN W. LATIMER.
JAMES A. GRAHAM.

Witness as to John W. Latimer:
  I. O. HOLMES.
Witness as to James A. Graham:
  M. L. EMERY.
Witness as to both signatures:
  CHAS. L. GOSS.